(12) United States Patent
Susca et al.

(10) Patent No.: US 12,281,616 B1
(45) Date of Patent: Apr. 22, 2025

(54) SINGLE VARIABLE DISPLACEMENT FUEL SYSTEMS WITH FUEL OIL COOLERS

(71) Applicant: Hamilton Sundstrand Corporation, Charlotte, NC (US)

(72) Inventors: Ryan Prescott Susca, Windsor, CT (US); Sachin Ramprashad, West Hartford, CT (US); Ryan Shook, Walla Walla, WA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 18/390,229

(22) Filed: Dec. 20, 2023

(51) Int. Cl.
*F02C 7/236* (2006.01)
*F02C 7/232* (2006.01)
*F02C 9/30* (2006.01)

(52) U.S. Cl.
CPC ............ *F02C 7/236* (2013.01); *F02C 7/232* (2013.01); *F02C 9/30* (2013.01)

(58) Field of Classification Search
CPC .................................................. F02C 7/236
See application file for complete search history.

(56) References Cited

U.S. PATENT DOCUMENTS

| 5,116,362 | A | * | 5/1992 | Arline | F02C 7/236 60/734 |
| 10,041,497 | B2 | * | 8/2018 | Nyzen | F02C 7/236 |
| 11,994,078 | B1 | * | 5/2024 | Shook | F04B 1/295 |
| 12,031,487 | B1 | * | 7/2024 | Susca | F02C 9/263 |
| 2013/0086909 | A1 | | 4/2013 | Wang et al. | |
| 2014/0290266 | A1 | * | 10/2014 | Veilleux, Jr. | F02C 7/236 60/734 |
| 2015/0101339 | A1 | * | 4/2015 | Veilleux, Jr. | F02C 7/236 60/734 |
| 2018/0112660 | A1 | * | 4/2018 | Rhoden | F04C 15/0061 |
| 2018/0340501 | A1 | | 11/2018 | Ni et al. | |
| 2021/0079848 | A1 | * | 3/2021 | Cocks | F02C 7/236 |
| 2021/0222625 | A1 | * | 7/2021 | O'Rorke | F02C 7/236 |
| 2023/0132118 | A1 | * | 4/2023 | Goy | F02C 7/32 415/123 |

FOREIGN PATENT DOCUMENTS

EP 694120 A1 1/1996

* cited by examiner

Primary Examiner — David P. Olynick
(74) Attorney, Agent, or Firm — Kinney & Lange, P.A.

(57) ABSTRACT

A system includes an actuation pump sub-system (APS) with an inlet configured to feed fuel from a fuel source into the APS, a first outlet configured for connecting the APS in fluid communication with an actuation system to supply fuel flow for actuation, a second outlet feeding into a supply line, and a third outlet feeding into the supply line. A fuel oil cooler (FOC) is included in a first branch of the supply line. The FOC is in fluid communication to receive flow from the second outlet. The APS includes a bypass valve (BPV) in a second branch of the supply line, in parallel with the FOC and in fluid communication to allow flow from the third outlet into the supply line bypassing the FOC. A main pump and control sub-system has a main inlet connected in fluid communication with the supply line downstream of the BPV and FOC.

14 Claims, 1 Drawing Sheet

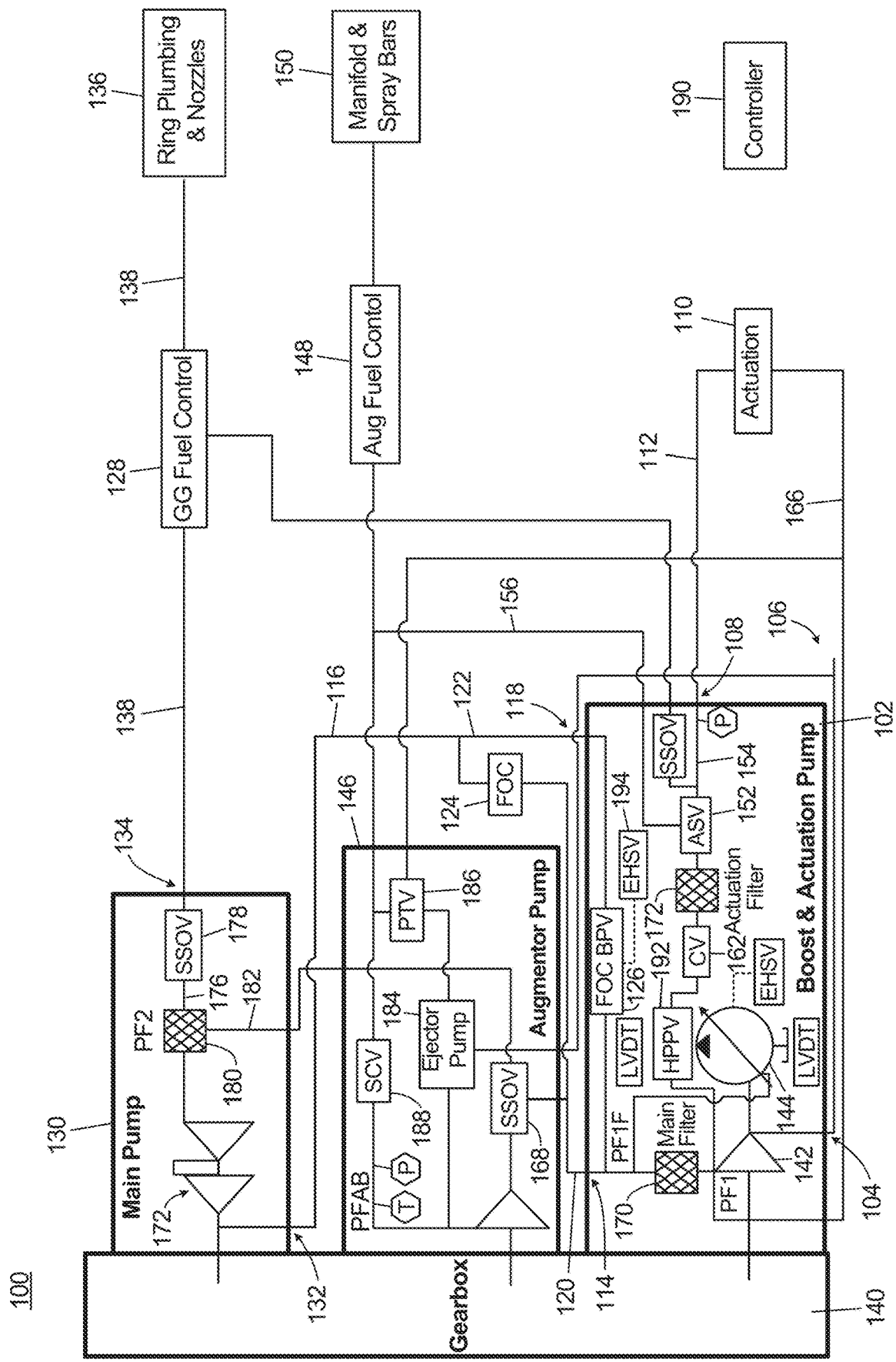

SINGLE VARIABLE DISPLACEMENT FUEL SYSTEMS WITH FUEL OIL COOLERS

BACKGROUND

1. Field

The present disclosure relates to fuel systems, and more particularly to fuel systems for aircraft.

2. Description of Related Art

In modern aircraft it would be advantageous to eliminate the thermal recirculation system. This would reduce the number of fuel system components, and free space for carrying more fuel. However, thermal recirculation cannot typically be eliminated because the fuel oil coolers (FOC) in typical aircraft have over-temperature heat loads at low burn flow conditions, necessitating thermal recirculation systems.

The conventional techniques have been considered satisfactory for their intended purpose. However, there is an ever present need for improved systems and methods for handling heat loads in fuel systems. This disclosure provides a solution for this need.

SUMMARY

A system includes an actuation pump sub-system (APS) with an inlet configured to feed fuel from a fuel source into the APS, a first outlet configured for connecting the APS in fluid communication with an actuation system to supply fuel flow for actuation, a second outlet feeding into a supply line, and a third outlet feeding into the supply line. A fuel oil cooler (FOC) is included in a first branch of the supply line. The FOC is in fluid communication to receive flow from the second outlet. The APS includes a bypass valve (BPV) in a second branch of the supply line, in parallel with the FOC and in fluid communication to allow flow from the third outlet into the supply line bypassing the FOC. A main pump and control sub-system (MPCS) has a main inlet connected in fluid communication with the supply line downstream of the BPV and FOC, and a main outlet for supplying fuel to a downstream gas generator.

The system can be devoid of a thermal recirculation system. The system can include the gas generator connected in fluid communication with the main outlet of the MPCS and the actuation system connected in fluid communication with the first outlet of the APS. A gearbox can be connected to drive one or more fuel pumps in the APS, and to drive one or more pumps of the MPCS.

An augmentor pump can be operatively connected to be driven by the gearbox. The augmentor pump can be connected in fluid communication to supply an augmentor control. The APS can include a boost pump operatively connected between the inlet of the APS and the second outlet of the APS for boosting pressure of fuel from the supply to the pressure in the supply line. The APS can include a variable displacement pump (VDP) with a pump inlet in fluid communication to be supplied with boosted pressure from the boost pump, and a pump outlet connected in fluid communication with the first outlet of the APS. An augmentor selector valve (ASV) can be included in a line connecting the pump outlet of the VDP with the outlet of the APS. The ASV can be connected in fluid communication with a line connecting between the augmentor pump and the augmentor control for backup of the actuation system from the augmentor pump.

The APS can include a port connected in fluid communication with the outlet of the boost pump and the actuation system for return of fluid from the actuation system. The second outlet can be connected in fluid communication with the augmentor pump to supply backup pressure to the augmentor pump. The third outlet can be connected in fluid communication with a port of the MPCS to supply boosted pressure to the MPCS. A main filter can be included in a line connecting the boost pump to the second outlet of the APS. An actuation filter can be included in the line connecting the pump outlet of the first VDP with the first outlet of the APS.

The MPCS can include a fixed displacement pump with a pump inlet in fluid communication with the main inlet of the MPCS, and a pump outlet line in fluid communication with the main outlet of the MPCS. The fixed displacement pump can include two stages in series. A solenoid shutoff valve can be included in the pump outlet line for selectively shutting off flow from to a gas generator fuel control. A cross-over line can be connected in fluid communication from a shutoff valve in APS downstream of the ASV to the gas generator fuel control for back up of the MPCS by the APS. A main pump wash screen can be in fluid communication between the fixed displacement pump and the solenoid shutoff valve.

A controller can be operatively connected to control the BPV, the VDP, and the ASV. The controller can be operatively connected to sensors in the MPCS and APS for feedback in controlling the BPV, the VDP, and the ASV.

A method of controlling heat transfer in a fuel oil cooler (FOC) includes flowing fuel into an inlet of the FOC, through the FOC, and out an outlet of the FOC to absorb heat from oil flowing through the FOC while the oil has a temperature above a pre-determined overcooling limit. The method includes bypassing the FOC through a bypass valve connected in fluid communication with the inlet and the outlet in parallel with the FOC when the burn flow exceeds oil cooling demand to avoid overcooling the oil beyond a predetermined overcooling limit. Bypassing the FOC through the bypass valve includes actuating the bypass valve with pressurized fuel from an actuation pump sub-system (APS). Bypassing the FOC can be performed aboard an aircraft without flowing any fuel through any thermal recirculation system of the aircraft.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 1 is a schematic view of an embodiment of a system constructed in accordance with the present disclosure, showing the variable displacement pump, the fuel oil cooler (FOC), and the bypass valve for bypassing the FOC.

DETAILED DESCRIPTION OF THE PREFERRED EMBODIMENTS

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. The systems and methods described herein can be used to eliminate the need for fuel thermal recirculation system, by pairing a thermally efficient fuel system with the ability to modulate fuel flow to the fuel oil cooler (FOC) to prevent overcooling engine oil, e.g. aboard aircraft.

A system 100 includes an actuation pump sub-system (APS) 102 with an inlet 104 configured to feed fuel from a fuel source 106, e.g. the fuel tanks of an aircraft, into the APS 102. The APS 102 includes a first outlet 108 configured for connecting the APS 102 in fluid communication with an actuation system 110 through a line 112 to supply fuel flow for actuation. The APS 102 includes a second outlet 114 feeding into a first branch 120 of a supply line 116, and a third outlet 118 feeding into a second branch 122 of the supply line 116.

A fuel oil cooler (FOC) 124 is included in the first branch 120 of the supply line 116. The FOC 124 is in fluid communication to receive flow from the second outlet 114. The APS 102 includes a bypass valve (BPV) 126 in the second branch 122 of the supply line 116, in parallel with the FOC 124 and in fluid communication to allow flow from the third outlet 118 into the supply line 116 bypassing the FOC 124. A main pump and control sub-system (MPCS) includes a gas generator fuel control 128 and a main pump 130. The main pump 130 has a main inlet 132 connected in fluid communication with the supply line 116 downstream of the BPV 126 and the FOC 124. The main pump 130 includes a main outlet 134 for supplying fuel to a downstream gas generator 136, e.g. ring plumbing and nozzles of a gas turbine engine of an aircraft, through a line 138. The bypass function of the FOC 124 and BPV 126 make it possible for the system 100 to be devoid of a thermal recirculation system, which provides a weight savings that is valuable for aircraft, as well as a savings in complexity.

A gearbox 140 is connected to drive one or more fuel pumps 142, 144 in the APS 102, and to drive one or more pumps of the main pump 130. An augmentor pump 146 is also operatively connected to be driven by the gearbox 140. The augmentor pump 146 is connected in fluid communication to supply an augmentor control 148, which controls flow to an augmentor 150, e.g. including a manifold and spray bars.

The APS 102 includes a boost pump 142 operatively connected between the inlet 104 of the APS 102 and the second outlet 114 of the APS 102 for boosting pressure of fuel from the supply 106 to the pressure in the supply line 116. The APS 102 includes a variable displacement pump (VDP) 144 with a pump inlet in fluid communication to be supplied with boosted pressure from the boost pump 142, and a pump outlet connected in fluid communication with the first outlet 108 of the APS 102. The APS 102 includes a high pressure relief valve (HPRV) 192 configured to return over pressure flow from downstream of the VDP 144. A solenoid controlled augmentor selector valve (ASV) 152 is included in a line 154 connecting the pump outlet of the VDP 144 with the outlet 108 of the APS 102. The ASV 152 is connected in fluid communication with a line 156 connecting between the augmentor pump 146 and the augmentor control 148 for backup of the actuation system 110 from the augmentor pump 146, in which case, a check valve 162 prevents backflow into the VDP 144. Similarly, there is a solenoid controlled shutoff valve 158 connected in fluid communication with the line 154 and a cross-over or backup line 160 connecting the APS 102 to the main fuel control 128. The lines 156 and 160 allow backup functions for the APS 102 to back up the gas generator 136 or augmentor fuel control 148 control valve pressure.

The APS 102 includes a port 164 connected to a line 166 in fluid communication with the outlet of the boost pump 142 and the actuation system 110 for return of fluid from the actuation system 110. The second outlet 114 is connected in fluid communication with the augmentor pump 146, via a line controlled by a solenoid controlled shutoff valve 168 for supplying backup pressure to the augmentor pump 146, and that line 182 continues into the main pump 130 for backup of the main pump 130. The third outlet 118 is connected in fluid communication with a port of the MPCS, i.e. the inlet 132 of the main pump 130, to supply boosted pressure to the MPCS. A main filter 170 is included in a line connecting the boost pump 142 to the second outlet 114 of the APS 102. An actuation filter 172 is included in the line 154 downstream of the check valve 162 and upstream of the ASV 152.

The main pump 130 includes a fixed displacement pump 174 with a pump inlet in fluid communication with the main inlet 132, and a pump outlet line 176 in fluid communication with the main outlet 134. The fixed displacement pump 172 includes two stages in series. A solenoid controlled shutoff valve (SSOV) 178 is included in the pump outlet line 176 for selectively shutting off flow from to the gas generator fuel control 128. A main pump wash screen 180 is in fluid communication in the line 176 between the fixed displacement pump 172 and the solenoid shutoff valve 178, and the line 182 also connects into the pump wash screen 180.

The augmentor pump 146 includes an ejector pump 184, pump transfer valve (PTV) valve 186 and stabilizing check valve (SCV) valve 188. When augmentor pump 146 is off, the PTV 186 ports PF2 pressure to the augmentor control 148 to allow control to remain primed, isolating PF1. When the augmentor pump 146 is on, the PTV 186 ports PFAB to PF1 (isolating PF2) to provide a leakage path for pump cooling which can be required during pump initialized built-in test periods or during low augmentor fuel control demand. When the augmentor pump 146 is off, the stabilizing check valve (SCV) 188 is closed, acting as a check valve, to seal the augmentor pump cavity and prevent PF2 backflow into augmentor pump 146. When the augmentor pump 146 is on, pump pressure opens the SCV 188 and the SCV 188 acts as a stability valve to prevent pressure oscillations in the plumbing due to the significant plumbing volume that can cause pump and control ringing/constructive feedback.

The ejector pump 184 is utilized to evacuate the augmentor pump cavity when the pump 146 is off to reduce is gearbox horsepower extraction (the pump rotor spins in a vacuum versus churning in fluid). PF2 pressure is feed through a nozzle to create a jet of fluid that is pointed at a receiver which is plumbed to PF1, in the space between the nozzle and the receiver is the volume connected to the augmentor pump discharge, PFAB. The fluid passing from the nozzle to the receiver creates a venturi effect pulling the fluid in the pump discharge with it, eventually evacuating the pump cavity.

A controller 190 is operatively connected to control the BPV 126 (via the electrohydraulic solenoid valve (EHSV) connected by a dotted line to BPV 126 in FIG. 1), the VDP 144 (via the EHSV connected by a dotted line to BPV 126 in FIG. 1), and the ASV 152 and solenoid controlled valves described above. The controller 190 can use feedback from the pressure sensors labeled P and T and linear variable differential transformers (LVDT's) labeled in FIG. 1 that are used as position sensors for the VDP 144 and BPV 126. The controller 190 can execute methods as disclosed herein, e.g. using machine readable instructions.

A method of controlling heat transfer in a fuel oil cooler (FOC) 124 includes flowing fuel into an inlet of the FOC 124, through the FOC 124, and out an outlet of the FOC 124 to absorb heat from oil flowing through the FOC 124 while the oil has a temperature above a pre-determined overcooling limit. The method includes bypassing the FOC 124 through a BPV 126 connected in fluid communication with the inlet and the outlet in parallel with the FOC 124 when the burn flow exceeds oil cooling demand to avoid overcooling the oil beyond a predetermined overcooling limit. Bypassing the FOC 124 through the BPV includes actuating the BPV with pressurized fuel from an actuation pump sub-system (APS) 102, e.g. where the pressurized fuel is utilized in an EHSV 194 that actuations the BPV 126. Bypassing the FOC 124 can be performed aboard an aircraft without flowing any fuel through any thermal recirculation system of the aircraft.

Systems and methods as disclosed herein provide potential benefits including the following. They can eliminate the need for fuel thermal recirculation system by providing a fuel system that balances thermal efficiency/weight/cost, and by providing the ability to modulate fuel flow to the FOC to prevent overcooling engine oil. They also can provide optional gas generator fault accommodation (depending on single versus dual engine platforms). This can improves fuel system reliability, reduce fuel system weight/envelope, and can allows aircraft to carry more fuel. Having the BPV are inside the actuation pump section allows use of actuation pressure to actuate the BPV, helping reduce overall size and weight.

The methods and systems of the present disclosure, as described above and shown in the drawings, provide for eliminating the need for fuel thermal recirculation system, by pairing a thermally efficient fuel system with the ability to modulate fuel flow to the fuel oil cooler (FOC) to prevent overcooling engine oil.

What is claimed is:

1. A system comprising:
an actuation pump sub-system (APS) with an inlet configured to feed fuel from a fuel source into the APS, a first outlet configured for connecting the APS in fluid communication with an actuation system to supply fuel flow for actuation, a second outlet feeding into a supply line, and a third outlet feeding into the supply line;
a fuel oil cooler (FOC) in a first branch of the supply line, the FOC being in fluid communication to receive flow from the second outlet, wherein the APS includes a bypass valve (BPV) in a second branch of the supply line, in parallel with the FOC and in fluid communication to allow flow from the third outlet into the supply line bypassing the FOC;
an augmentor pump operatively connected to be driven by a gearbox, wherein the augmentor pump is connected in fluid communication to supply an augmentor control, wherein the APS includes a boost pump operatively connected between the inlet of the APS and the second outlet of the APS for boosting pressure of fuel from the supply to the pressure in the supply line, wherein the APS includes a variable displacement pump (VDP) with a pump inlet in fluid communication to be supplied with boosted pressure from the boost pump, and a pump outlet connected in fluid communication with the first outlet of the APS;
an augmentor selector valve (ASV) in a line connecting the pump outlet of the VDP with the outlet of the APS, wherein the ASV is connected in fluid communication with a line connecting between the augmentor pump and the augmentor control for backup supply to the augmentor control from the APS; and
a main pump and control sub-system (MPCS) with a main inlet connected in fluid communication with the supply line downstream of the BPV and FOC, and a main outlet for supplying fuel to a downstream gas generator.

2. The system as recited in claim 1, wherein the system is devoid of a thermal recirculation system.

3. The system as recited in claim 1, further comprising:
the gas generator connected in fluid communication with the main outlet of the MPCS; and
the actuation system connected in fluid communication with the first outlet of the APS.

4. The system as recited in claim 1, further comprising a gearbox, wherein the gearbox is connected to drive one or more fuel pumps in the APS, and to drive one or more pumps of the MPCS.

5. The system as recited in claim 1, wherein the APS includes a port connected in fluid communication with the outlet of the boost pump and the actuation system for return of fluid from the actuation system, wherein the second outlet is connected in fluid communication with the augmentor pump to supply backup pressure to the augmentor pump, and wherein the third outlet is connected in fluid communication with the main inlet of the MPCS to supply boosted pressure to the MPCS.

6. The system as recited in claim 5 wherein the MPCS includes a fixed displacement pump with a pump inlet in fluid communication with the main inlet of the MPCS, and a pump outlet line in fluid communication with the main outlet of the MPCS.

7. The system as recited in claim 6, further comprising a solenoid shutoff valve in the pump outlet line for selectively shutting off flow to a gas generator fuel control.

8. The system as recited in claim 7, further comprising a cross-over line connected in fluid communication from a shutoff valve in APS downstream of the ASV to the gas generator fuel control for back up of the MPCS by the APS.

9. The system as recited in claim 8, further comprising a main pump wash screen in fluid communication between the fixed displacement pump and the solenoid shutoff valve.

10. The system as recited in claim 9, wherein the fixed displacement pump includes two stages in series.

11. The system as recited in claim 9, further comprising a main filter in a line connecting the boost pump to the second outlet of the APS.

12. They system as recited in claim 9, further comprising an actuation filter in a line connecting the pump outlet of the first VDP with the first outlet of the APS.

13. The system as recited in claim 9, further comprising a controller operatively connected to control the BPV, the VDP, and the ASV.

14. The system as recited in claim 10, wherein a controller is operatively connected to sensors in the MPCS and APS for feedback in controlling the BPV, the VDP, and the ASV.

* * * * *